(12) United States Patent
Kuah (10) Patent No.: US 8,346,459 B2
(45) Date of Patent: Jan. 1, 2013

(54) OIL PRESSURE CONTROLLING APPARATUS AND SYSTEM COMPRISING SAME

(76) Inventor: Aikmeng Kuah, Pflugerville, TX (US)

( * ) Notice: Subject to any disclaimer, the term of this patent is extended or adjusted under 35 U.S.C. 154(b) by 686 days.

(21) Appl. No.: 12/454,237

(22) Filed: May 14, 2009

(65) Prior Publication Data

US 2010/0292850 A1 Nov. 18, 2010

(51) Int. Cl.
 - *F01M 1/04* (2006.01)
 - *F01M 1/18* (2006.01)
 - *F01M 1/20* (2006.01)

(52) U.S. Cl. .............. 701/107; 123/198 R; 123/196 CP; 123/196 S; 123/198 D; 701/114

(58) Field of Classification Search .................. 701/101, 701/102, 107, 114, 104; 123/196 R, 196 CP, 123/196 AB, 196 S; 184/6.3, 6.4
See application file for complete search history.

(56) References Cited

U.S. PATENT DOCUMENTS

| | | | |
|---|---|---|---|
| 2,373,360 A | 4/1945 | Walsh | |
| 2,796,075 A | 6/1957 | Focht | |
| 4,199,950 A | 4/1980 | Hakanson et al. | |
| 5,078,233 A * | 1/1992 | Oetting et al. | 184/6.5 |
| 5,209,453 A | 5/1993 | Aota et al. | |
| 5,568,842 A | 10/1996 | Otani | |
| 5,836,421 A * | 11/1998 | Leicht | 184/6.2 |
| 5,901,811 A * | 5/1999 | Samples et al. | 184/6.3 |
| 6,148,789 A * | 11/2000 | Johns | 123/196 S |
| 6,161,515 A | 12/2000 | Kopec | |
| 6,386,170 B1 * | 5/2002 | Iwano et al. | 123/196 R |
| 6,523,519 B2 * | 2/2003 | Iwano et al. | 123/196 R |
| 6,626,141 B2 * | 9/2003 | Choi | 123/196 R |
| 6,665,605 B2 | 12/2003 | Boyer et al. | |
| 6,860,244 B2 | 3/2005 | Glugla et al. | |
| 6,973,908 B2 | 12/2005 | Paro | |
| 7,114,482 B2 | 10/2006 | Lane | |
| 7,379,801 B2 | 5/2008 | Heffington | |
| 2003/0131819 A1 | 7/2003 | Paro | |
| 2006/0223670 A1 * | 10/2006 | Nishikawa et al. | 477/168 |

* cited by examiner

*Primary Examiner* — Stephen K Cronin
*Assistant Examiner* — Raza Najmuddin (57) ABSTRACT

An oil flow control system has a flow control device and an oil accumulator controller. The flow control device includes a body, a passage extending through the body, and a flow control portion configured for selectively controlling flow through the passage. The oil accumulator controller is coupled to an actuation portion of the flow control device and is configured for receiving an engine oil pressure indicating signal from an engine oil pressure sensor, for receiving Minimum Engine Lubrication Oil Pressure (MELOP) threshold computing information for an engine comprising the engine oil pressure sensor, and for causing the actuation portion to manipulate the flow control portion in a manner resulting in the flow control portion affecting flow through the passage. Causing the actuation portion to manipulate the flow control portion is performed dependent upon the engine oil pressure indicating signal and a MELOP threshold computed using said MELOP threshold computing information.

9 Claims, 6 Drawing Sheets

OIL PRESSURE CONTROLLING APPARATUS AND SYSTEM COMPRISING SAME

FIELD OF THE DISCLOSURE

The disclosures made herein relate generally to powertrain systems having a pressurized lubricant system and, more particularly, to controlling oil pressure in internal combustion engines.

BACKGROUND

A reciprocating internal combustion engine such as that in an automobile is one example of an engine that includes an integral lubrication system. Such a lubrication system supplies lubricant (e.g., oil) for limiting friction and transporting heat away from critical moving components. Loss of oil pressure in the lubrication system can result in damage, if not catastrophic failure, of such machine due to as excessive friction and/or heat retention. For example, in an automobile engine, high lateral g-force such as those encountered in race applications can cause oil in an oil sump (e.g., oil pan) to move away from a pickup tube of an oil pump within the oil sump thereby resulting in a sudden and often dramatic drop in oil pressure within the lubrication system (i.e., a loss of oil pressure). Such a loss in oil pressure, even for fractions of a second, can result in loss of lubrication that causes damage to surface of engine components that are in moving relation to other components. Examples of such components include, but are not limited to, camshafts, crankshafts, pistons, lifters, oil pump impellers, bearings, and the like.

An engine oil accumulator is a reservoir of pressurized engine oil that works to reduce engine oil pressure fluctuations. Such fluctuations can be exhibited as a partial or the complete loss of oil pressure. AccuSump, which is the trademark name of Canton racing Products, is one example of a commercially available engine oil accumulator. When engine oil pressure suddenly drops, such as under high g-force causing the oil in the oil sump to move away from the pickup tube of the oil pump, the engine oil accumulator discharges oil under sufficient pressure to provide continued flow of oil to the engine under suitable pressure. The engine oil accumulator is re-charged by directing a portion of oil flow from the oil pump to the engine oil accumulator during normal operation of the engine lubrication system (i.e., the engine lubrication system having ample capacity to supply pressurized oil to meet the demands of the engine and to deliver oil under pressure into the engine oil accumulator (e.g., an oil reservoir thereof)). Thus, it can be seen that an engine oil accumulator functions as a mechanical oil pressure dampener.

In basic operation of known engine oil accumulators, an accumulator is allowed to discharge oil into a connected lubrication system at any time when the engine is running. A refinement of such basic operation is to allow the engine oil accumulator to discharge oil into the connected lubrication system only when oil pressure within the connected lubrication system is above a certain lower-limit threshold level. Such a refinement prevents the engine oil accumulator from discharging oil when the engine is in an idling condition and/or at a low rpm condition. For example, a commercially available valve offered by Canton racing Products under the tradename ACCUSUMP EPC Valve allows flow into the engine oil accumulator only when engine oil pressure is below a threshold engine oil pressure (i.e., allows it to charge and prevents it from discharging), and allows bi-directional flow when engine oil pressure is above a threshold engine oil pressure thereby allowing the engine oil accumulator to charge and discharge (i.e., via mechanical control means only). Effectively, the ACCUSUMP EPC Valve causes an engine oil accumulator to operate normally (i.e., as a mechanical oil pressure dampener) only above the threshold engine oil pressure, and shuts it off below that threshold, thereby preventing it from discharging when the engine is operating at low engine speeds and engine load.

In the lubrication system of a reciprocating internal combustion engine, engine oil pressure/flow demands are generally not constant. Under high engine speeds and engine loads, greater oil pressure/flow is required to carry frictional heat away from engine components and maintain an oil film of sufficient viscosity for hydrodynamic lubrication of said components. Engine load is a measurement of how hard an engine is working, and can be calculated from a variety of parameters, including but not restricted to, engine speed, throttle position, mass air flow, volumetric air flow, intake air temperature, intake manifold pressure, exhaust manifold pressure, torque and horsepower. An engine requires less oil pressure/flow when operating at low engine speeds and light engine load (such as when idling or cruising at constant highway speeds), but requires more oil pressure/flow when operating at high engine speeds and high engine load (such as when rapidly accelerating the vehicle and/or propelling the vehicle uphill).

A common (and simplified) guideline for engine oil pressure/flow requirement for a typical reciprocating internal combustion engine is that engine oil pressure should increase 10 psi for every 1000 rpm of engine speed. More complex guidelines may be determined, such as derived from a Stribeck curve for a specific engine and engine oil, which may express an engine oil pressure/flow requirement in terms of, but not restricted to, the following parameters—engine speed, oil temperature, and engine load. A variety of methods exist for determining the oil pressure requirement, the choice of which depends on the user.

A skilled person will appreciate that oil pressure or oil flow demands in an engine are not constant across all operating conditions. Therefore, an oil pressure/flow controlling apparatus that causes pressurized oil to be discharged from an accumulator by comparing current engine oil pressure against a specified engine oil pressure threshold overcomes drawbacks associated with conventional engine oil accumulators and methods for facilitating oil delivery therefrom, thus making such an oil pressure/flow controlling apparatus advantageous, desirable and useful.

SUMMARY OF THE DISCLOSURE

Embodiments of the present invention relate to an oil pressure controlling apparatus. More specifically, embodiments of the present invention include an electronic controller configured for controlling the charging and discharging of an engine oil accumulator in a manner that improves efficiency of such charging and discharging. The electronic controller causes pressurized oil to be discharged from and delivered into an engine oil accumulator as a function of engine oil pressure and/or oil flow demand for the engine operating condition. Accordingly, because oil pressure and/or oil flow demands in an engine are not constant across all operating conditions, embodiments of the present invention advantageously overcome one or more shortcomings associated with conventional engine oil accumulators and methods for facilitating oil delivery therefrom.

In one embodiment of the present invention, a method comprises a plurality of operations. An operation is performed for monitoring an engine oil pressure indicating signal provided by an engine oil pressure sensor coupled to an oil passage of an engine and an operation is performed for monitoring Minimum Engine Lubrication Oil Pressure (MELOP) threshold computing information for the engine. An operation is performed for causing a flow control device to discharge oil from an engine oil accumulator into the oil passage in response to the engine oil pressure indicating signal indicating that pressure of oil in the oil passage is less than a MELOP threshold derived using the MELOP threshold computing information.

In another embodiment of the present invention, an oil flow control system comprises a flow control device and an oil accumulator controller. The flow control device includes a body, a passage extending through the body, and a flow control portion configured for selectively controlling flow through the passage. The oil accumulator controller is coupled to an actuation portion of the flow control device. The oil accumulator controller is configured for receiving an engine oil pressure indicating signal from an engine oil pressure sensor, for receiving Minimum Engine Lubrication Oil Pressure (MELOP) threshold computing information for an engine comprising the engine oil pressure sensor, and for causing the actuation portion to manipulate the flow control portion in a manner resulting in the flow control portion affecting flow through the passage. Causing the actuation portion to manipulate the flow control portion is performed dependent upon the engine oil pressure indicating signal and a MELOP threshold derived using the MELOP threshold computing information.

In another embodiment of the present invention, an oil accumulator controller comprises an interface configured for receiving an engine oil pressure indicating signal from an engine oil pressure sensor coupled to an oil passage of an engine, an interface configured for receiving Minimum Engine Lubrication Oil Pressure (MELOP) threshold computing information for the engine, an interface configured for providing a control signal to a flow control device coupled to an engine oil accumulator, memory having instructions stored thereon and accessible therefrom, and one or more data processing devices coupled to the memory and to each one of the interfaces. The one or more data processing devices are configured for accessing and interpreting the instructions. The instructions are configured for monitoring the engine oil pressure indicating signal, for monitoring the MELOP threshold computing information, and for causing a flow control device to discharge oil from an engine oil accumulator into the oil passage in response to the engine oil pressure indicating signal indicating that pressure of oil in the oil passage is less than a MELOP threshold derived using the MELOP threshold computing information.

Thus, it can be seen that through use of an electronically actuated valve, an electronic controller and an engine oil pressure sensor, discharging and charging of an engine oil accumulator can be controlled so that oil is only discharged from the engine oil accumulator when engine oil pressure drops below a MELOP threshold. Such operation allows the engine oil accumulator to be charged only when an oil pump of an engine is meeting specified oil pressure/flow requirements of the engine and to the discharged only when oil pressure in the engine is below a specified MELOP threshold needed for a given engine operating condition.

These and other objects, embodiments, advantages and/or distinctions of the present invention will become readily apparent upon further review of the following specification, associated drawings and appended claims.

DETAILED DESCRIPTION OF THE DRAWING FIGURES

A MELOP threshold is defined herein to be a minimum oil pressure required to provide adequate lubrication for given engine operating conditions. A particular MELOP threshold is derived using MELOP threshold computing information. Examples of such MELOP threshold computing information includes, but is not limited to, engine speed (rpm), engine load, oil temperature, engine coolant temperature, throttle position, mass air flow, volumetric air flow, intake manifold pressure, and exhaust manifold pressure. Furthermore, the MELOP threshold can be directly proportional to engine speed, a function of load computing parameters, or other fixed or computed values. The present invention is not limited to any particular form or type of information used in deriving a MELOP threshold. As such, the MELOP threshold can be derived (e.g., calculated or computed) from a user defined mathematical function or matrix, when given specific values corresponding to required MELOP threshold computing information. In view of the foregoing discussion, a skilled person will appreciate that derivation of a MELOP threshold can range from very simple (e.g., 10 psi per 1000 rpm of engine speed) to very complex (e.g., solving a Stribeck curve for a particular engine).

Figure 1:
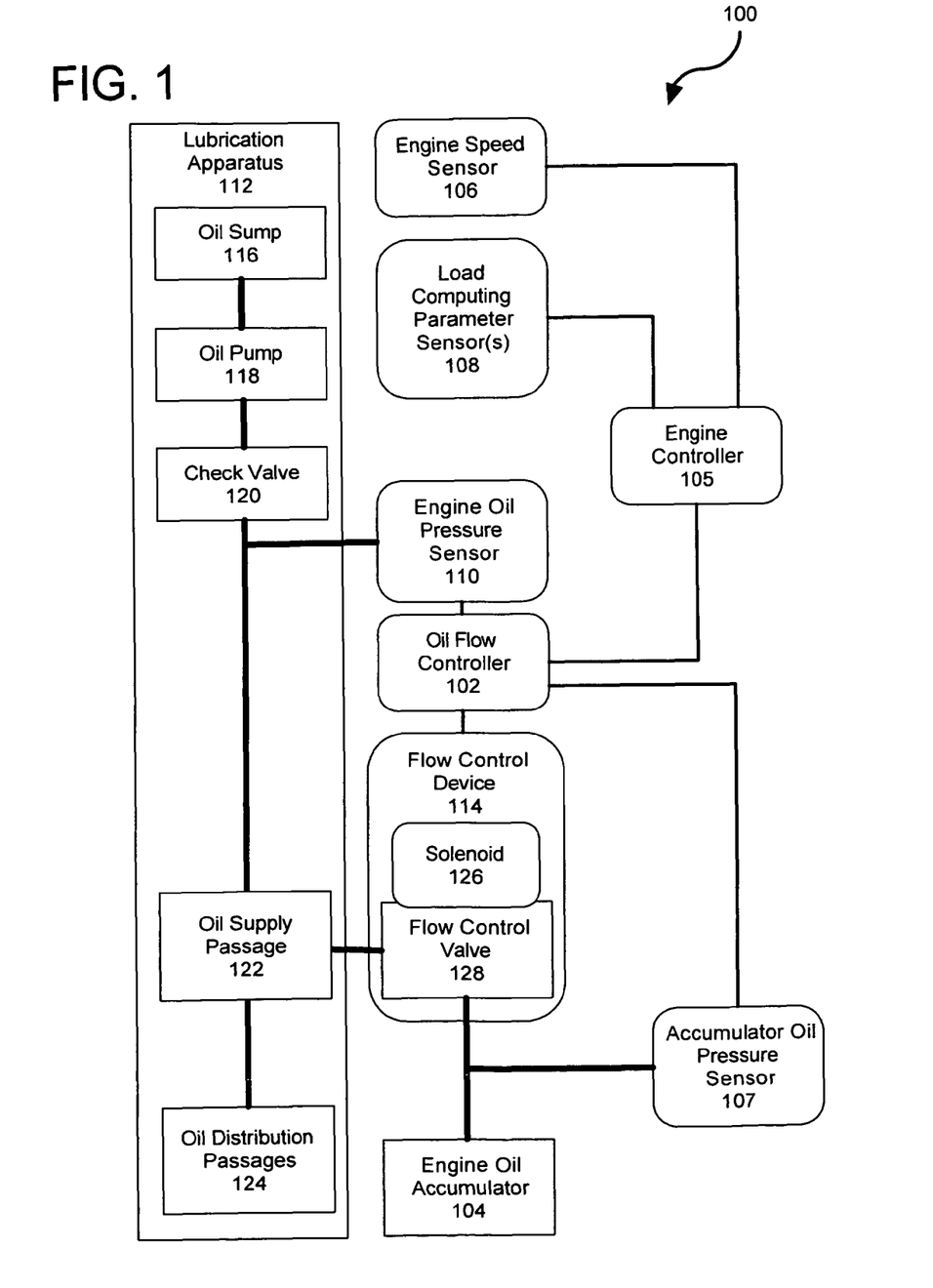
FIG. 1 is a block diagram showing a system configured in accordance with an embodiment of the present invention.

FIG. 1 shows an oil flow control system (i.e., system 100) that is configured in accordance with an embodiment of the present invention. The system 100 relies upon an electronic oil flow controller 102 that is configured for controlling charging and discharging of an engine oil accumulator 104 in a manner that improves efficiency and effectiveness of such charging and discharging. The oil flow controller 102 causes pressurized oil to be discharged from and delivered into an engine oil accumulator (i.e., accumulator 104) dependent upon a MELOP threshold. It is disclosed herein that the MELOP threshold can be a function of or proportional to engine load, engine speed and/or other engine operating parameters. Accordingly, because oil pressure and/or oil flow demands in an engine are not constant across all operating conditions, the system 100 advantageously overcome one or more shortcomings associated with conventional engine oil accumulators and methods for facilitating oil delivery therefrom.

In at least one embodiment of the present invention, the system 100 advantageously charges and discharges the accumulator 104 dependent upon engine speed and/or engine load. Engine speed is a direct operating parameter measured at the crankshaft using the engine speed sensor 110. Engine load is a relative value corresponding to a percentage of theoretical or intended maximum load exerted on the engine at a given engine operating condition.

In one embodiment (shown), the system 100 includes an engine controller 105 and a plurality of electronic sensors that support charging and discharging of accumulator 104 as a function of engine load and/or engine speed. As such, engine load and engine speed can be MELOP threshold computing information. These sensors include an engine speed sensor 106, an accumulator oil pressure sensor 107, one or more load computing parameter sensors 108 and an engine oil pressure sensor 110. The engine speed sensor 106 provides a signal corresponding to a speed at which a crankshaft of the engine is rotating. As such, the engine speed sensor 106 provides an engine speed indicating signal. The accumulator oil pressure sensor 107 provides a signal that corresponds to a pressure under which oil is stored in the accumulator 104. As such, the accumulator oil pressure sensor 107 provides an accumulator oil pressure indicating signal. It is disclosed herein that a sensor that senses oil flow is an embodiment of an oil pressure sensor within the context of the disclosures made herein. Oil flow and oil pressure are generally directly related, so oil flow can be a measure of whether oil requirements are being met (i.e., is the oil flow sufficient to cause required oil pressure). Thus, the engine oil pressure sensor 110 can be a sensor that senses oil flow (i.e., an oil flow sensor).

The one or more load computing parameter sensors 108 each provide a respective signal that corresponds to a relative operating condition of the engine. There are numerous different schemes for computing engine load. For example, such different load computing schemes can rely upon engine speed in combination with one or more of throttle position, mass airflow, volumetric airflow, intake manifold pressure, and exhaust manifold pressure. Accordingly, examples of load parameter sensors that provide respective signals used in computing load include, but are not limited to, a throttle position sensor, a mass air flow sensor, a volumetric airflow sensor, an intake manifold pressure sensor, and an exhaust manifold pressure sensor. As such, the one or more load computing parameter sensors 108 provides respective load computing parameter signals. Furthermore, such sensors and their respective signals can be MELOP threshold computing information.

The engine controller 105 is connected to the engine speed sensor 106 and the one or more load computing parameter sensors 108, thereby allowing the engine controller 105 to compute engine load dependent upon the engine speed indicating signal received from the engine speed sensor 106 and the one or more load computing parameter signals received from the one or more load computing parameter sensors 108. Each one of the load computing parameter signals corresponds to a respective load computing parameter values. The engine oil pressure sensor 110 provides a signal that corresponds to a pressure under which oil is being delivered into an oil supply passage on an engine comprising the system 100 (i.e., engine oil pressure). As such, the engine oil pressure sensor 110 provides an engine oil pressure indicating signal.

As shown in FIG. 1, the oil flow controller 102 is connected to the engine controller 105, the engine oil pressure sensor 110 and the accumulator oil pressure sensor 107. The oil flow controller 102 generates an accumulator control signal used for controlling accumulator charging and discharging functionality. Alternatively, engine speed can be used an as approximation of engine load, whereby the oil flow controller 102 uses an engine speed indicating signal as the load indicating signal when generating the accumulator control signal. In such an alternate embodiment, the oil flow controller 102 can receive the engine speed indicating signal directly from the engine speed sensor 106 or from the engine controller 105. Accordingly, in at least one embodiment of the present invention, accumulator charging functionality and accumulator discharging functionality does not rely upon the one or more load computing parameter sensors 108 or the engine controller 105.

Still referring to FIG. 1, the system 100 includes a lubrication apparatus 112 and a flow control device 114 (i.e., an accumulator oil flow control device). The lubrication apparatus 112 includes an oil sump 116 (e.g., oil pan), an oil pump 118, a check valve 120, an oil supply passage 122 (e.g., main oil galley) and oil distribution passages 124. In one embodiment, the check-valve 120 and/or the oil supply passage 122 are integral with the oil pump 118. In another embodiment, oil supply passage is a feature of an engine block and the check valve 120 is a discrete unit mounted on the block or on the oil pump. The underlying functionality of the check valve 120 is to preclude oil from the accumulator 104 from flowing into the oil pump 118 (i.e., when oil pressure of the accumulator 104 is greater than oil pressure being supplied from the oil pump 118). Examples of the check valve 120 include, but are not limited to a mechanical (e.g., spring-biased) check valve, a electrically controlled check valve (e.g., solenoid-actuated valve controlled by engine oil flow controller), and the like. The oil pump 118 is connected between the check valve 120 and the oil sump 116. The oil supply passage extends between the check valve 120 and the oil distribution passages 124. The flow control device 114 is connected between the oil supply passage 122 and the engine oil accumulator 104 and is configured for allowing the accumulator 104 to be selectively discharged and charged with engine oil supplied via the oil pump 118 through the oil supply passage. Optionally, the accumulator 104 can be attached to one or more of the distribution oil passages 124 (e.g., in addition to the oil supply passage 122) in a manner allowing oil to be delivered directly thereto as opposed to being delivered solely to the oil distribution passages 124 via the oil supply passage 122.

The flow control device 114 includes a solenoid 126 (i.e., an electrical actuator) and a flow control valve 128. The solenoid 126 is coupled to the flow control valve 128 in a manner allowing the actuation and de-actuation of the solenoid 126 to cause flow through a passage (i.e., flow-through passage) of the flow control valve 128 to be selective varied (e.g., inhibited and allowed). The solenoid 126 is electrically connected to the oil flow controller 102 for receiving the accumulator control signal from the oil flow controller 102. The flow control valve 128 has a passage thereof connected between the oil supply passage 122 and to the engine oil accumulator 104. The engine oil accumulator 104 includes a reservoir for having oil stored therein under pressure and a reservoir access passage through which oil is delivered into and supplied from within the reservoir. Accordingly, the passage of the flow control device is coupled to the reservoir access passage of the engine oil accumulator 104. A skilled person will appreciate that it is well known for a flow control valve to include a passage extending through a body thereof and a flow control portion (e.g., ball valve, plunger valve, etc) configured for selectively opening and closing the passage to allow and inhibit flow therethrough.

Figure 2:
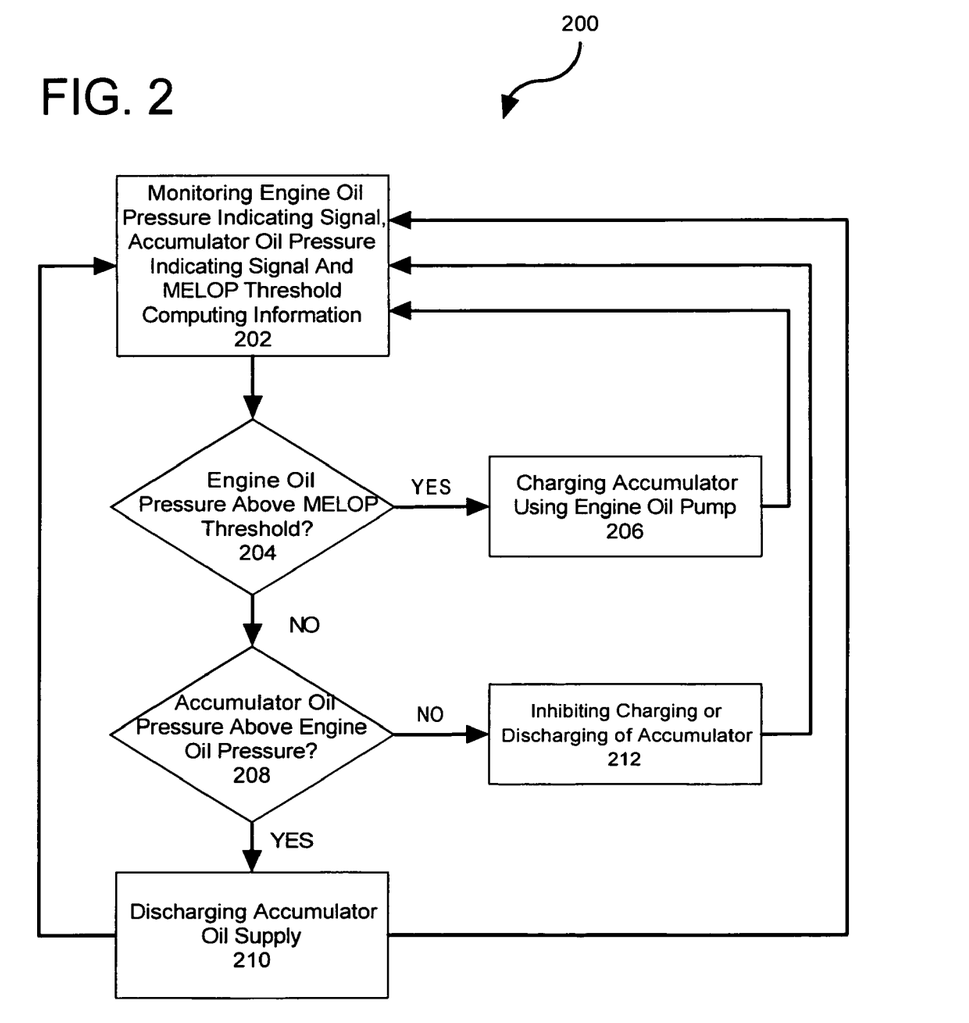
FIG. 2 is a flow diagram showing a method configured in accordance with an embodiment of the present invention.

Referring now to FIG. 2, a method 200 for controlling engine oil flow in accordance with an embodiment of the present invention is shown. The method 200 is configured for controlling the charging and discharging of an engine oil accumulator in a manner that improves efficiency and effectiveness of such charging and discharging. The system 100 disclosed above is one example of a system configured for carrying out accumulator charging and discharging functionality in accordance with the method 200. In view of the disclosures made herein, a skilled person will appreciate other approaches for configuring systems to carry out accumulator charging and discharging functionality in accordance with the present invention.

Figure 3:
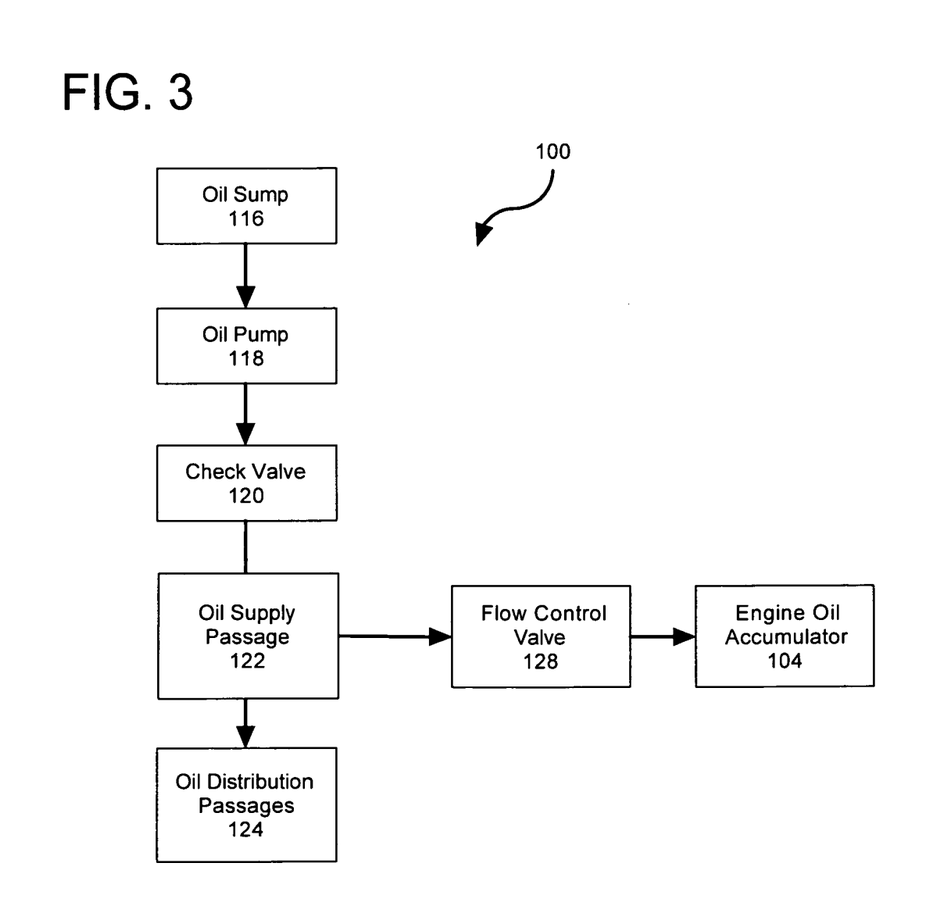
FIG. 3 is a flow diagram showing oil flow within the system of FIG. 1 during accumulator recharging.

The method 200 begins with an operation 202 for continuously monitoring an engine oil pressure indicating signal corresponding to oil pressure within a passage of an engine, MELOP threshold computing information, and an accumulator oil pressure indicating signal corresponding to oil pressure within an engine oil accumulator. In one embodiment, the engine oil pressure signal is provided from an engine oil pressure sensor, the accumulator oil pressure indicating signal is provided by an accumulator oil pressure sensor, and the MELOP threshold computing information corresponds to one or more signals provided directly from one or more sensors (e.g., engine speed sensor). In response to performing an operation 204 for determining if the engine oil pressure is above a specified MELOP threshold (e.g., a load-based MELOP threshold) derived using the MELOP threshold computing information, an operation 206 is performed for charging an engine oil accumulator with oil in response to determining that the engine oil pressure is above the specified MELOP threshold (i.e., opening a flow control valve connected to the accumulator). In one embodiment, such charging includes allowing engine oil supplied under pressure from an oil pump of a lubricant apparatus of the engine to be delivered into the engine oil accumulator, as shown in FIG. 3. It is disclosed herein that the specified MELOP threshold can be based on a curve that is customizable by a user (e.g., adjustable on a per data point basis, offset of a fixed curve, etc) or that is non-customizable (e.g., a fixed, static curve).

Figure 4:
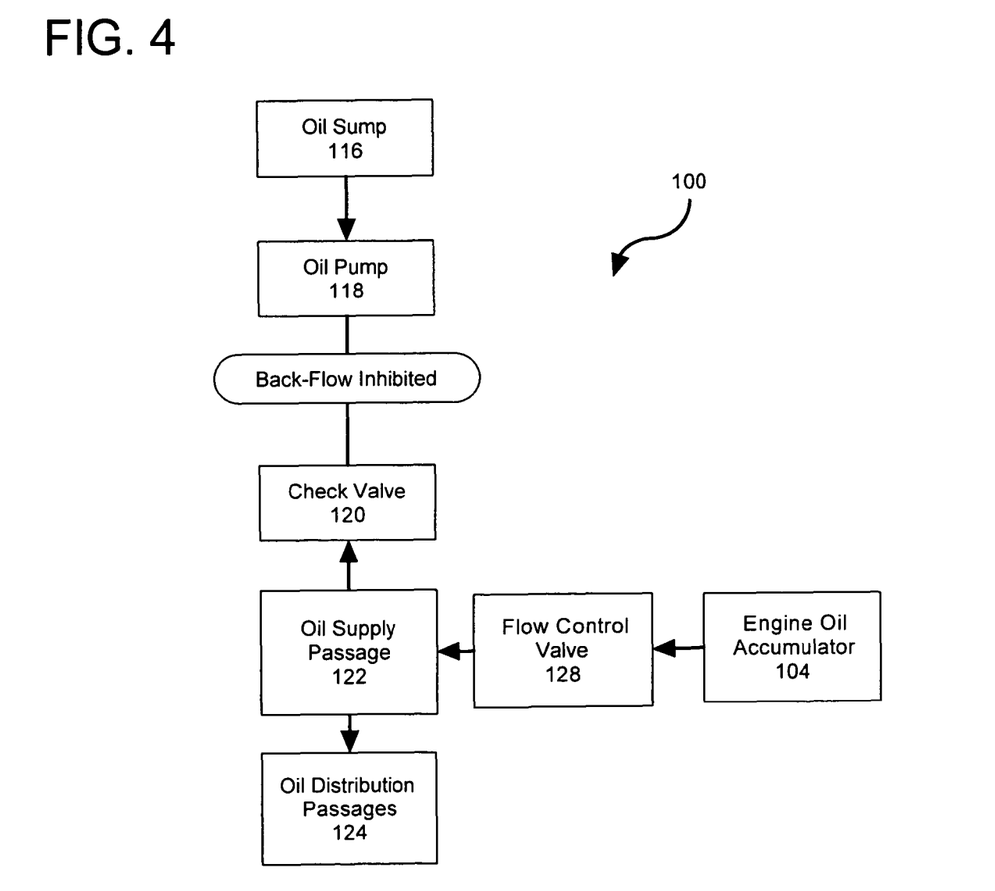
FIG. 4 is a flow diagram showing oil flow within the system of FIG. 1 during accumulator discharging.
Figure 5:
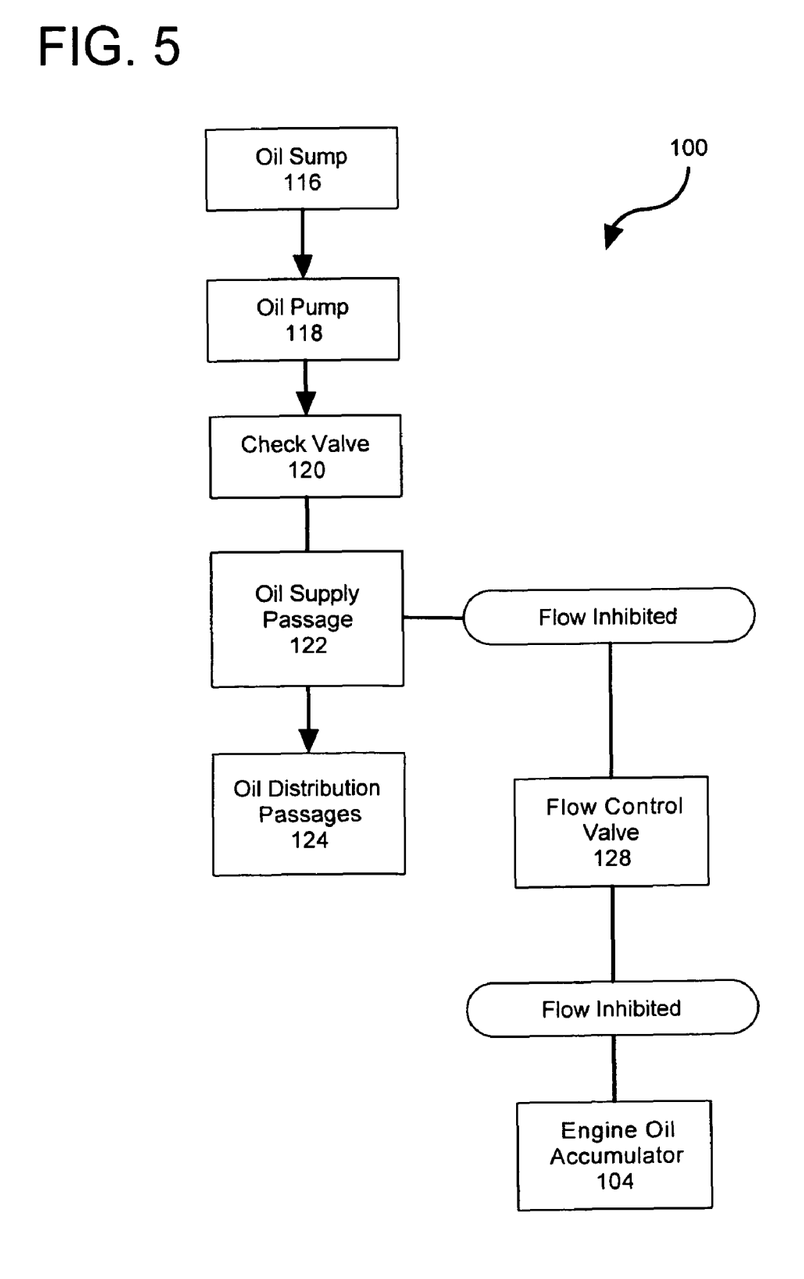
FIG. 5 is a flow diagram showing oil flow within the system of FIG. 1 when accumulator charging and discharging are inhibited.

In response to determining that the engine oil pressure is below the specified MELOP threshold, an operation 208 is performed for determining if the accumulator oil pressure is above the engine oil pressure. In response to determining that the accumulator oil pressure is above the engine oil pressure concurrently with the engine oil pressure being below the specified MELOP threshold (i.e., as determined at operation 204), an operation 210 is performed for discharging oil from the accumulator (i.e., opening a flow control valve connected to the accumulator). In one embodiment, such discharging includes allowing oil under pressure in the accumulator to be delivered into an oil supply passage of the engine that is connected to the accumulator, as shown in FIG. 4. In response to determining that the accumulator oil pressure is below the engine oil pressure concurrently with the engine oil pressure being below the specified MELOP threshold (i.e., as determined at operation 204), an operation 212 is performed for inhibiting charging or discharging of the discharging the accumulator (i.e., closing a flow control valve connected to the accumulator). When it is determined that the accumulator oil pressure is below the engine oil pressure concurrently with the engine oil pressure being below the specified MELOP threshold, it is desirable to inhibit flow of oil to accumulator such that an entire portion of oil provided by the oil pump can be supplied to critical moving parts of the engine, as shown in FIG. 5. Otherwise, recharging of the accumulator may result in further loss of oil pressure in the engine and damage to engine parts due to lack of sufficient lubrication. However, it is disclosed herein that the operation 208 for determining if the accumulator oil pressure is above the engine oil pressure and the operation 212 for inhibiting charging or discharging of the accumulator are optional.

Figure 6:
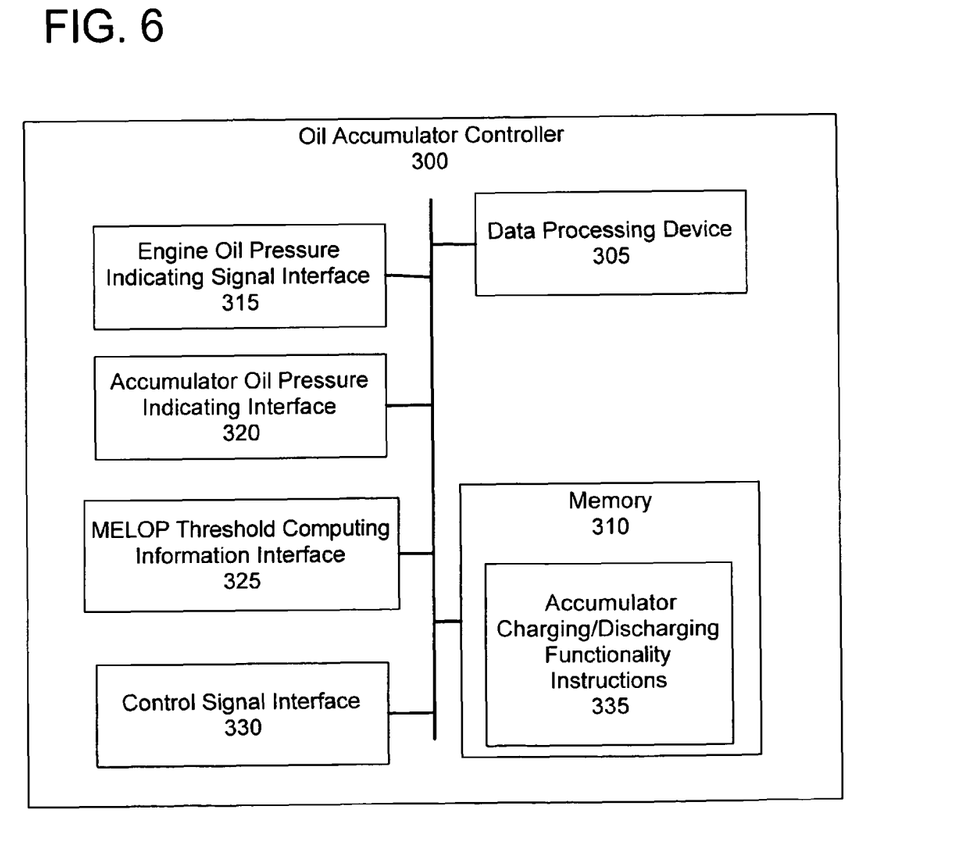
FIG. 6 is a block diagram showing an oil accumulator controller configured in accordance with an embodiment of the present invention.

Referring now to FIG. 6, an oil accumulator controller 300 configured in accordance with an embodiment of the present invention is shown. The oil accumulator controller 300 includes a data processing device 305, memory 310, an engine oil pressure indicating signal interface 315, an accumulator oil pressure indicating signal 320, a MELOP threshold computing information interface 325, and a control signal interface 330. The data processing device 305, the memory 310, the engine oil pressure indicating signal interface 315, the accumulator oil pressure indicating signal 320, the MELOP threshold computing information interface 325, and the control signal interface 330 are interconnected for enabling interaction therebetween. Residing in the memory 310 are instructions 335 for, among other functionality, carrying out accumulator charging and discharging functionality in accordance with the present invention (e.g., as embodied in the method 200). The instructions 335 are accessible from within the memory 310 and are processable by the data processing device 305. The instructions 335 are configured for enabling the data processing device 305 to facilitate operations comprising accumulator charging and discharging functionality in accordance with the present invention (e.g., as embodied in the method 200).

It is disclosed herein that, in at least one embodiment of the present invention, only the discharge of the engine oil accumulator is controlled, and not charging of the engine accumulator. In this manner, a simple implementation of the present invention is where the engine oil accumulator is allowed to charge whenever the engine is running and only the discharge of oil from the engine oil accumulator is controlled. In effect, the mechanical pressure inside the engine oil accumulator provides some control of flow into the accumulator. It should also be noted that, in such embodiments, use of an accumulator oil pressure gauge and/or accumulator oil pressure indicating signal is optional.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for controlling oil flow between an oil accumulator and an internal combustion engine ('engine'), comprising:

monitoring an engine oil pressure indicating signal provided by an engine oil pressure sensor coupled to an oil passage of the engine;

monitoring Minimum Engine Lubrication Oil Pressure (MELOP) threshold computing information for the engine, wherein the MELOP threshold is proportional to an operating speed of the engine or is a function of a plurality of load computing parameter values; and causing a flow control device to discharge oil from an engine oil accumulator into the oil passage in response to the engine oil pressure indicating signal indicating that pressure of oil in the oil passage is less than the MELOP threshold for the engine; and causing the flow control device to direct oil from an oil pump of the engine into the engine oil accumulator in response to the engine oil pressure indicating signal indicating that pressure of oil in the oil passage is greater than the specified MELOP threshold, monitoring an accumulator oil pressure indicating signal; and causing the flow control device to inhibit oil from the oil pump being directed into the engine oil accumulator in response to the accumulator oil pressure indicating signal indicating that pressure of oil within the engine oil accumulator is less than said pressure of oil in the oil passage when the engine oil pressure indicating signal indicating that said pressure of oil in the oil passage is less than the MELOP threshold.

2. The method of claim 1, further comprising:

closing a passage extending between the engine oil accumulator and the oil pump in conjunction with causing the flow control device to discharge oil from the engine oil accumulator into the oil passage of the engine.

3. The method of claim 1, further comprising:

monitoring an accumulator oil pressure indicating signal; and causing the flow control device to inhibit oil from the oil pump being directed into the engine oil accumulator in response to the accumulator oil pressure indicating signal indicating that pressure of oil within the engine oil accumulator is less than said pressure of oil in the oil passage when the engine oil pressure indicating signal indicating that said pressure of oil in the oil passage is less than the specified MELOP threshold, wherein the MELOP threshold is either directly proportional to an operating speed of the engine or a computed value that is a function of a plurality of load computing parameter values.

4. An oil flow control system, comprising:

a flow control device including an flow-through passage and a flow control portion configured for selectively controlling flow through the flow-through passage; and an oil accumulator controller coupled to an actuation portion of the flow control device, wherein the oil accumulator controller is configured for receiving an engine oil pressure indicating signal from an engine oil pressure sensor, and programmed to manipulate the flow control device to discharge oil from the engine oil accumulator into the engine oil passage, in response to an engine oil pressure indicating signal indicating that pressure of oil in the engine oil passage is less than the computed Minimum Engine Lubrication Oil Pressure (MELOP) threshold for the engine, wherein the MELOP threshold is proportional to an operating speed of the engine or is a function of a plurality of load computing parameter values, causing the flow control device to direct oil from an oil pump of the engine into the engine oil accumulator in response to the engine oil pressure indicating signal indicating that pressure of oil in the oil passage is greater than the specified MELOP threshold, monitoring an accumulator oil pressure indicating signal; and causing the flow control device to inhibit oil from the oil pump being directed into the engine oil accumulator in response to the accumulator oil pressure indicating signal indicating that pressure of oil within the engine oil accumulator is less than said pressure of oil in the oil passage when the engine oil pressure indicating signal indicating that said pressure of oil in the oil passage is less than the MELOP threshold.

5. The system of claim 4 wherein:

the oil accumulator controller is configured for receiving an accumulator oil pressure indicating signal; and the oil accumulator controller is programmed to manipulate the flow control device to discharge oil from the engine oil accumulator into the engine oil passage, in response to the engine oil pressure indicating signal corresponding to an engine oil pressure that is less than the MELOP threshold when the accumulator oil pressure indicating signal indicates that pressure of oil within the engine oil accumulator is greater than said pressure of oil in the oil passage; and the oil accumulator controller is programmed to manipulate the flow control device to inhibit flow of oil between the engine oil accumulator and the engine oil passage, in response to the engine oil pressure indicating signal corresponding to an engine oil pressure less than the MELOP threshold when the accumulator oil pressure indicating signal indicates that pressure of oil within the engine oil accumulator is less than said pressure of oil in the oil passage.

6. An oil accumulator controller, comprising:

an interface configured for receiving an engine oil pressure indicating signal from an engine oil pressure sensor coupled to an oil passage of an engine;

an interface configured for receiving Minimum Engine Lubrication Oil Pressure (MELOP) threshold computing information from an engine comprising the engine oil pressure sensor, wherein the MELOP threshold computing information comprises the operating speed of the engine or a plurality of load computing parameter values; an interface configured for providing a control signal to a flow control device coupled to an engine oil accumulator;

wherein the controller is programmed to manipulate the flow control device to discharge oil from an engine oil accumulator into the oil passage in response to the engine oil pressure indicating signal indicating that pressure of oil in the oil passage is less than a MELOP threshold computed from said MELOP threshold computing information, cause the flow control device to direct oil from an oil pump of the engine into the engine oil accumulator in response to the engine oil pressure indicating signal indicating that pressure of oil in the oil passage is greater than the specified MELOP threshold, monitor an accumulator oil pressure indicating signal; and cause the flow control device to inhibit oil from the oil pump being directed into the engine oil accumulator in response to the accumulator oil pressure indicating signal indicating that pressure of oil within the engine oil accumulator is less than said pressure of oil in the oil passage when the engine oil pressure indicating signal indicating that said pressure of oil in the oil passage is less than the MELOP threshold.

7. The controller of claim 6 wherein the controller is programmed to:

manipulate the flow control device to direct oil from an oil pump of the engine into the engine oil accumulator in response to the engine oil pressure indicating signal indicating that pressure of oil in the oil passage is greater than the MELOP threshold.

8. The controller of claim 7, further comprising:

an interface configured for receiving an accumulator oil pressure indicating signal from an accumulator oil pressure sensor coupled to the engine oil accumulator;

wherein the controller is programmed to manipulate the flow control device to inhibit oil from the oil pump being directed into the engine oil accumulator in response to the accumulator oil pressure indicating signal indicating that pressure of oil within the engine oil accumulator is less than said pressure of oil in the oil passage when the engine oil pressure indicating signal is indicating that said pressure of oil in the oil passage is less than the MELOP threshold.

9. The controller of claim 6 wherein the controller is programmed for:

causing a passage extending between the engine oil accumulator and the oil pump to be closed in conjunction with causing the flow control device to discharge oil from the engine oil accumulator into the oil passage of the engine.

* * * * *